(12) United States Patent
Ghosh et al.

(10) Patent No.: US 9,571,906 B2
(45) Date of Patent: Feb. 14, 2017

(54) LOCATION BASED ADVERTISING AND QUERYING FOR LOW POWER DEVICES IN A WIRELESS LOCAL-AREA NETWORK

(71) Applicant: Intel IP Corporation, Santa Clara, CA (US)

(72) Inventors: Chittabrata Ghosh, Fremont, CA (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/082,232

(22) Filed: Mar. 28, 2016

(65) Prior Publication Data
US 2017/0019722 A1    Jan. 19, 2017

Related U.S. Application Data

(60) Provisional application No. 62/191,579, filed on Jul. 13, 2015.

(51) Int. Cl.
*H04Q 9/00* (2006.01)
*H04W 52/02* (2009.01)
*H04W 84/18* (2009.01)

(52) U.S. Cl.
CPC .......... *H04Q 9/00* (2013.01); *H04W 52/0229* (2013.01); *H04Q 2209/40* (2013.01); *H04Q 2209/75* (2013.01); *H04W 84/18* (2013.01)

(58) Field of Classification Search
CPC .......... H04Q 9/00; H04W 4/02; H04W 4/023; G06Q 30/0251
See application file for complete search history.

(56) References Cited

U.S. PATENT DOCUMENTS

2015/0371273 A1*   12/2015   Canpolat .............. H04W 4/02
                                                              705/14.58

* cited by examiner

*Primary Examiner* — Curtis Odom
(74) *Attorney, Agent, or Firm* — Schwegman Lundberg & Woessner, P.A.

(57) ABSTRACT

Apparatuses, methods, and computer readable media are disclosed for location based advertising and querying for low power devices in a wireless local-area network. An apparatus is disclosed including memory and processing circuitry couple to the memory, where the processing circuitry is configured to: encode a location-based advertisement (LBA) frame comprising a first location identifier (LID) and a duration, configure the access point to transmit the LBA frame to a sensor hub with a second LID, where the first LID and the second LID match, and decode a feedback report from the sensor hub, where the feedback report is in response to the LBA frame. The feedback report may include measured data from one or more internet of things (IoT) devices, and some of the measured data may be collected from the IoT devices during the duration. An apparatus of a sensor hub is disclosed that includes a LID.

28 Claims, 8 Drawing Sheets

LOCATION BASED ADVERTISING AND QUERYING FOR LOW POWER DEVICES IN A WIRELESS LOCAL-AREA NETWORK

PRIORITY CLAIM

This application claims the benefit of priority under 35 U.S.C. 119(e) to U.S. Provisional Patent Application Ser. No. 62/191,579 filed Jul. 13, 2015, which is incorporated herein by reference in its entirety.

TECHNICAL FIELD

Embodiments relate to wireless devices. Some embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to access gateways, sensor hubs, and sensors for location-based advertisement and/or querying (LBA).

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols. Some wireless devices may operate with limited power owing to battery operation and with short or long range and may have limited functionality. Moreover, there may be many limited power and/or limited functionality wireless devices.

Thus, there are general needs for methods, apparatuses, and computer readable media for location based query for low power devices.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
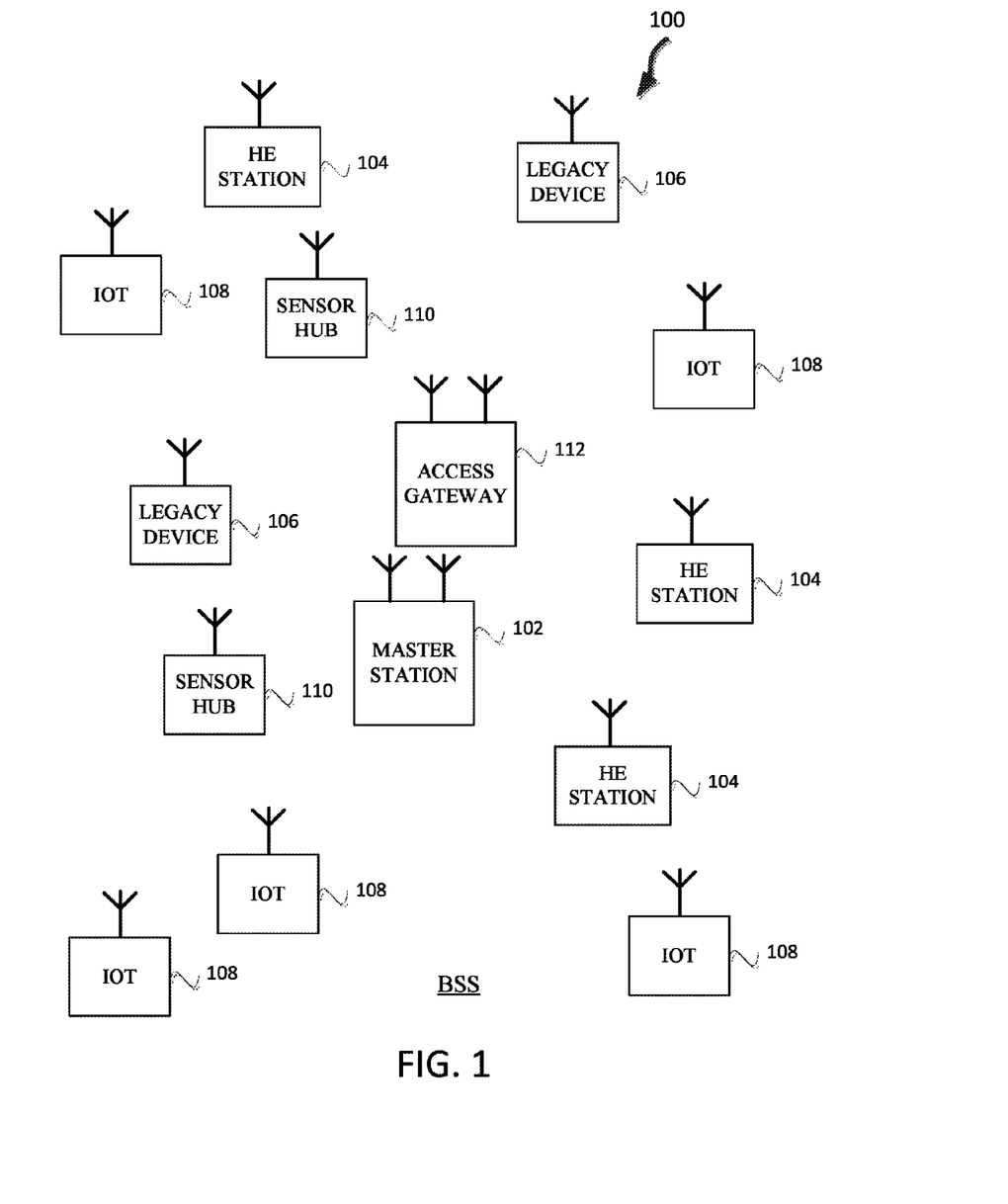
FIG. 1 illustrates a wireless network in accordance with some embodiments.

FIG. 1 illustrates a WLAN 100 in accordance with some embodiments. The WLAN may comprise a basis service set (BSS) 100 that may include one or more master stations 102, which may be APs or IoT gateways, one or more high efficiency (HE) wireless stations (HE stations) (e.g., IEEE 802.11ax) HE stations 104, a plurality of legacy (e.g., IEEE 802.11n/ac) devices 106, a plurality of IoT devices 108 (e.g., IEEE 802.11ax), and one or more sensor hubs 110.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax, which may be capable of supporting low power IoT devices. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 may be a virtual master station 102 shares hardware resources with another wireless device such as another master station 102.

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HE stations 104 may be wireless transmit and receive devices such as cellular telephone, smart telephone, handheld wireless device, wireless glasses, wireless watch, wireless personal device, tablet, a portable wireless device, or another device that may be transmitting and receiving using the IEEE 802.11 protocol such as IEEE 802.11ax or another wireless protocol. In some embodiments, the HE stations 104 may be termed high efficiency wireless local-area network (HEW) stations.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

The IoT devices 108 may operate in accordance with IEEE 802.11ax or another standard of 802.11. The IoT devices 108 may be, in some embodiments, narrow band devices that operate on a smaller sub-channel than the HE stations 104. For example, the IoT devices 108 may operate on 2.03 MHz or 4.06 MHz sub-channels. In some embodiments, the IoT devices 108 are not able to transmit on a full 20 MHz sub-channel to the master station 102 with sufficient power for the master station 102 to receive the transmission. In some embodiments, the IoT devices 108 are not able to receive on a 20 MHz sub-channel and must decode frames on a small sub-channel such as 2.03 MHz or 4.06 MHz sub-channel, which may be 26 data subcarriers or 52 data subcarriers. In some embodiments, the IoT devices 108 may operate on a sub-channel with exactly 26 or 52 data subcarriers. The IoT devices 108, in some embodiments, may be short-range, low-power devices.

The IoT devices 108 may be battery constrained. The IoT devices 108 may be sensors designed to measure one or more specific parameters of interest such as temperature sensor, pressure sensor, humidity sensor, light sensor, etc. The IoT devices 108 may be location-specific sensors. Some IoT devices 108 may be connected to a sensor hub 110. The IoT devices 108 may upload measured data, which in some embodiments may be from sensors, to the sensor hub 110. The sensor hubs 110 may upload the data to an access gateway 112 or AP that connects several sensor hubs 110 and can connect to a cloud sever or the Internet (not illustrated). The master station 102 may act as the access gateway 112 in accordance with some embodiments. The master station 102 may act as the sensor hub 110 in accordance with some embodiments. The IoT device 108 may have identifiers that identify a type of data that is measured from the sensors. In some embodiments, the IoT device 108 may be able to determine a location of the IoT device 108 based on received satellite signals or received terrestrial wireless signals.

In some embodiments, at least some of the IoT devices 108 need to consume very low average or peak power in order to perform a packet exchange with the sensor hub 110 and/or access gateway 112. The IoT devices 108 may be densely deployed.

The IoT devices 108 may enter a power save mode and may exit the power save at intervals to gather data from sensors and/or to upload the data to the sensor hub 110 or access gateway 112.

In some embodiments, the master station 102 HE stations 104, legacy stations 106, IoT devices 108, access gateways 112, Bluetooth™ devices, and/or sensor hubs 110 enter a power save mode and exit the power save mode periodically or at a pre-scheduled times to see if there is a packet for them to be received. In some embodiments, the master station 102 HE stations 104, legacy stations 106, IoT devices 108, access gateways 112, Bluetooth™ devices, and/or sensor hubs 110 may remain in a power save mode until receiving a wake-up packet. In some embodiments the HE stations 104 may act as group owners (GOs) and perform some functions of a master station 102 for peer-to-peer operations, e.g. the HE station 104 may be configured to transmit trigger frames.

In some embodiments, a HE frame may be configurable to have the same bandwidth as a subchannel. The bandwidth of a sub-channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 2.03125 MHz, 4.0625 MHz, 8.28125 MHz, a combination thereof or another bandwidth that is less or equal to the available bandwidth may also be used. The sub-channel may be based on a number of data sub-carriers or data tones, e.g. 26 or 52 with additional subcarriers that may be used for other reasons such as DC nulls, guard intervals, beacons, or another use other than data tones. In some embodiments the bandwidth of the sub-channels may be based on a number of active subcarriers.

In some embodiments, the bandwidth of a sub-channel may be equivalent to one of OFDMA sub-channels defined in IEEE 802.11ax. In some embodiments, the OFDMA sub-channels of IEEE 802.11ax that are less than 20 MHz are equivalent to 26-tone, 52-tone and 106-tone allocations. The bandwidth of these OFDMA allocations may be 20 MHz divided by 256 of a Fast Fourier Transform (FFT)-size times 26 or 52 or 106, for bandwidths of 2.03125 MHz, 4.0625 MHz, 8.28125 MHz, respectively. In some embodiments, the sub -channels may be a combination thereof or another bandwidth that is less or equal to the available bandwidth may also be used.

A HE packet may be configured for transmitting a number of spatial streams, which may be in accordance with MU-MIMO. In other embodiments, the master station 102, HE stations 104, sensor hubs 110, access gateway 112, and/or legacy devices 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may he termed a transmission opportunity (TXOP). The master station 102 may transmit a HE trigger frame, which may be a trigger packet or HE control and schedule transmission, at the beginning of the HEW control period. The master station 102 may transmit a time duration of the TXOP and sub-channel information. During the HE control period, HEW stations 104 may communicate with the master station 102 in accordance with a non-contention based multiple access technique such as OFDMA or MU-MIMO.

This is unlike conventional wireless local-area network (WLAN) communications in which devices communicate in accordance with a contention -based communication technique, rather than a multiple access technique. During the HE control period, legacy stations refrain from communicating.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106, sensor hubs 110, access gateway 112, and/or HE stations 104 in accordance with legacy IEEE 802.11 communication techniques. In example embodiments, a master station 102, access gateway 112, HE station 104, legacy station 106, IoT devices 108, and/or sensor hub 110 may be configured to perform the methods and functions herein described in conjunction with FIGS. 1-8.

Figure 2:
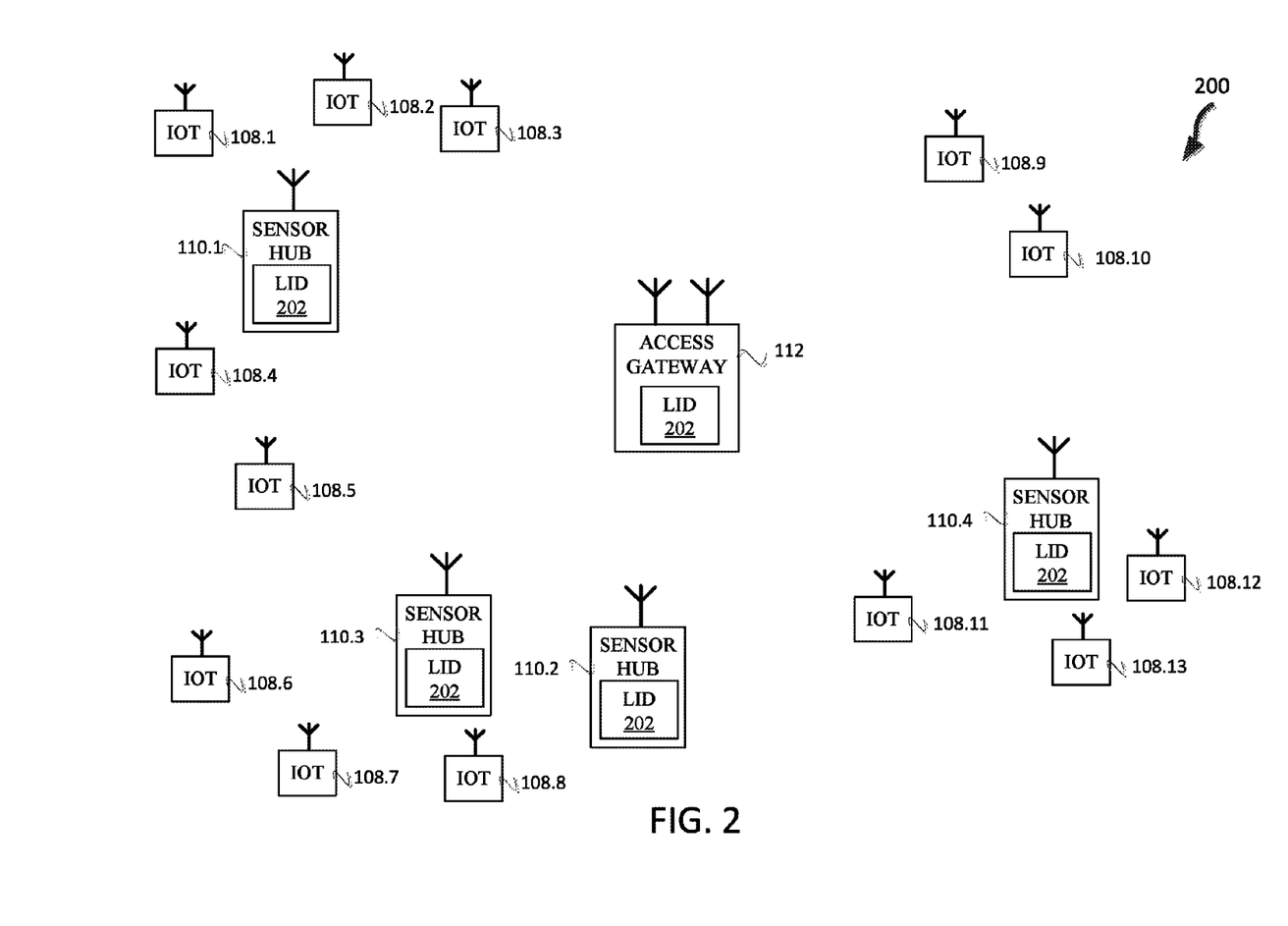
FIG. 2 illustrates a wireless local-area network in accordance with some embodiments.

FIG. 2 illustrates a wireless local-area network 200 in accordance with some embodiments. Illustrated in FIG. 2 are IoT devices 108, sensor hubs 110, and an access gateway 112. The sensor hubs 110 and access gateways 112 may include a LID 202. The LID 202 may be an indication of a geographic location of the sensor hub 110. The sensor hub 110 may determine the LID 202 based on satellite signals, terrestrial wireless signals, signals received over a cable, or based on a hard-wired geographic location. For example, the sensor hub 110 and/or access gateway 112 may use a global positioning system (GPS) that is a space-based navigation system. In some embodiments, the sensor hub 110 and/or access gateway 112 may use signals from another wireless devices to determine the LID 202. For example, the sensor hub 110, access gateway 112, and/or IoT devices 108 may exchange signals with another wireless device and determine an approximate location based on a time of flight for signals to reach the sensor hub 110, access gateway 112, and/or IoT devices 108.

In some embodiments, IoT devices 108 may include a LID 202 and may be configured to determine a location of the IoT device 108 and/or may be configured to receive a location of the IoT device 108 from another device such as the sensor hub 110 or access gateway 112.

The IoT devices 108 may attach to sensor hubs 110 based on the location of the IoT 108 devices. For example, IoT device 108.4 may determine that sensor hub 110.1 is closer to IoT device 108.4 than sensor hub 110.3 based on signal strengths.

Figure 3:
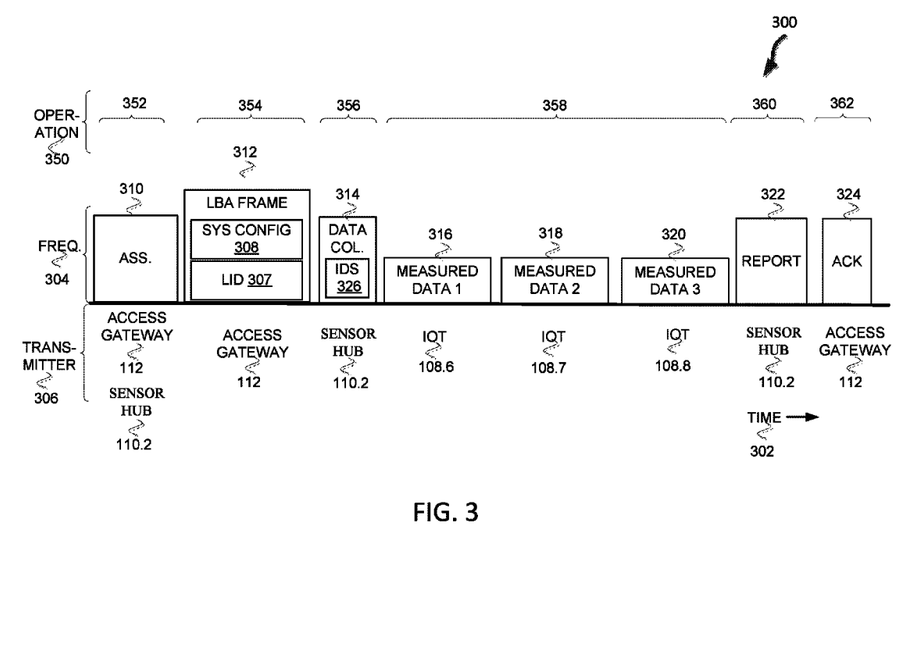
FIG. 3 illustrates a method of location based advertising and querying for low power devices in accordance with some embodiments.

FIG. 3 illustrates a method 300 of location based advertising and querying for low power devices in accordance with some embodiments. Illustrated in FIG. 3 is time 302 along a horizontal axis, operations 350, frequency 304, and transmitter 306.

The method 300 may begin at operation 352 with one or more sensor hubs 110 associating with the access gateway 112. For example, sensor hub 110 and access gateway 112 may exchange one or more packets to associate with one another. The access gateway 112 may provide an association identification (AID) to the sensor hub 110. The access gateway 112 may provide a system configuration 308 to the sensor hub 110.

Figure 4:
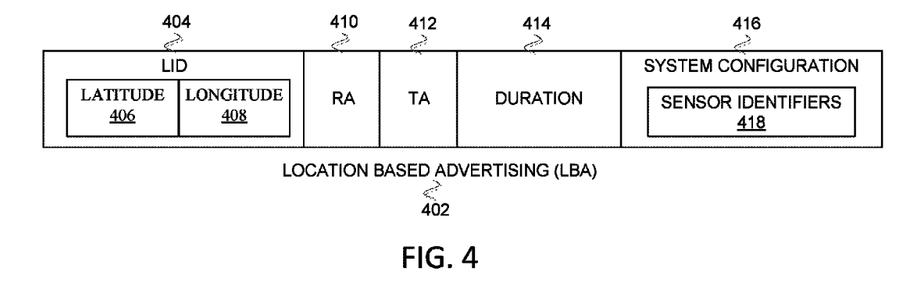
FIG. 4 illustrates a LBA frame in accordance with some embodiments.

The method 300 continues at operation 354 with the access gateway 112 transmitting a LBA frame 312. The LBA frame 312 may include a system configuration 308 and LID 404. The LID 307 may be an LID 404 as disclosed in conjunction with FIG. 4. The LBA frame 312 may be an LBA frame 402 as disclosed in conjunction with FIG. 4. FIG. 4 is disclosed in conjunction with FIG. 3. FIG. 4 illustrates a LBA frame 402 in accordance with some embodiments. Illustrated in FIG. 4 is an LID 404, receiver address (RA) 410, transmitter address (TA) 412, duration 414, and system configuration 416. The system configuration 416 may include one or more sensor identifiers 418. The LID 404 may indicate a location which may be a geographic location.

In some embodiments, the LID 404 includes latitude 406 and a longitude 408. In some embodiments, the latitude 406 may be one octet. In some embodiments, the longitude 408 may be one octet. The RA 410 may be an indication of a receiver. For example, the RA 410 may be an AID or another indication of an identity of the receiver such as a MAC address. The TA 412 may be an identity of the transmitter such as a MAC address. The duration 414 may be duration for wireless devices that receive the LBA frame 402 to set a network allocation vector (NAV). The duration 414 may be set to duration to enable a sensor hub 110 to collect data and transmit it to the transmitter of the LBA frame 402. For example, in FIG. 3 the duration 414 may be set to include operations 354, 356, 358, 360, and 362. The duration 414 being set may help IoT devices 108 to transmit data measurements by setting the NAV of other devices such as legacy devices 106, master stations 102, sensor hubs 110, access gateways 112, and/or HE stations 104.

The system configuration 416 may include configurations for sensor hubs 110 and/or IoT devices 108. The system configuration 416 may include a sleep cycle for the IoT devices 108, a sleep cycle for IoT devices 108 with a group identifier, an indication of data to measure for the IoT device 108, an indication of data to measure for the sensor hub, an indication of data to measure for the sensor hub based on group identifiers, and a frequency to collect the measure data, which may be based on a group identifier.

In some embodiments, the access gateway 112 and/or sensor hub 110 may maintain a schedule of the sleep schedules of the IoT devices 108 and/or the sensor hubs 110. The access gateway 112 and/or the sensor hubs 110 may be configured to maintain a schedule of the sleep intervals or times of the sensor hubs 110 and/or IoT devices 108. The access gateway 112 and/or sensor hubs 110 may be configured to transmit frames in accordance with the sleep intervals or times of the sensor hubs 110 and/or IoT devices 108 so that the sensor hubs 110 and/or IoT devices 108 may be awake to receive the frames.

In some embodiments, the LBA frame 312 is transmitted on a bandwidth the IoT devices 108 can receive. The IoT devices 108 may receive the LBA frame 312 and adjust their configuration based on the system configuration 308.

The method 300 may continue at operation 356 with transmitting a data collection frame 314. The data collection frame 314 may indicate a type of data to collection, collection frequency, a group identifier, and may include system configuration (not illustrated with the data collection frame 314). For example, the data collection frame 314 may include identifications (IDS) 326 that may be identifications of the IoT devices 108 such as AIDs, MAC addresses, etc. The IDS 326 may also include one or more group identifiers that indicate a type of data to be measured or reported. For example, there may be a group identifier for temperature measured data. The data collection frame 314 may include an indication of an order for the IoT devices 108 to report data.

The method 300 may continue at operation 358 with IoT devices 108.6, 108.7, and 108.8, transmitting measured data 1 316, measured data 2 318, and measured data 3 320, respectively.

The IoT devices 108 may receive the data collection frame 314 which may indicate a type of data to collection, collection frequency, a group identifier, and may include system configuration (not illustrated with the data collection frame 314). The IoT devices 108 may determine when to transmit based on an order in the data collection frame 314. In some embodiments, the IoT devices 108 may contend for the wireless medium to transmit the measured data 1 316, measure data 2 318, and measured data 3 320. The IoT devices 108 may transmit the measured data 1 316, measured data 2 318, and measured data 3 320 on bandwidths that are smaller than the bandwidth the LBA frame 312 is transmitted on.

The method 300 may continue at operation 360 with the sensor hub 110 transmitting a report 322 to the access gateway 112. The report 322 may include the measured data 1 316, measured data 2 318, and measured data 3 320. In some embodiments, the report 322 may include configuration information related to the system configuration 308 for the sensor hub 110 and/or the IoT devices 108.

The method 300 may continue at operation 362 with the access gateway 112 transmitting an acknowledgement (ACK) 324 to the sensor gateway 112 acknowledging receipt of the report 322. The method 300 may end or may continue with additional operations such as the transmittal of another LBA frame 312.

Figure 5:
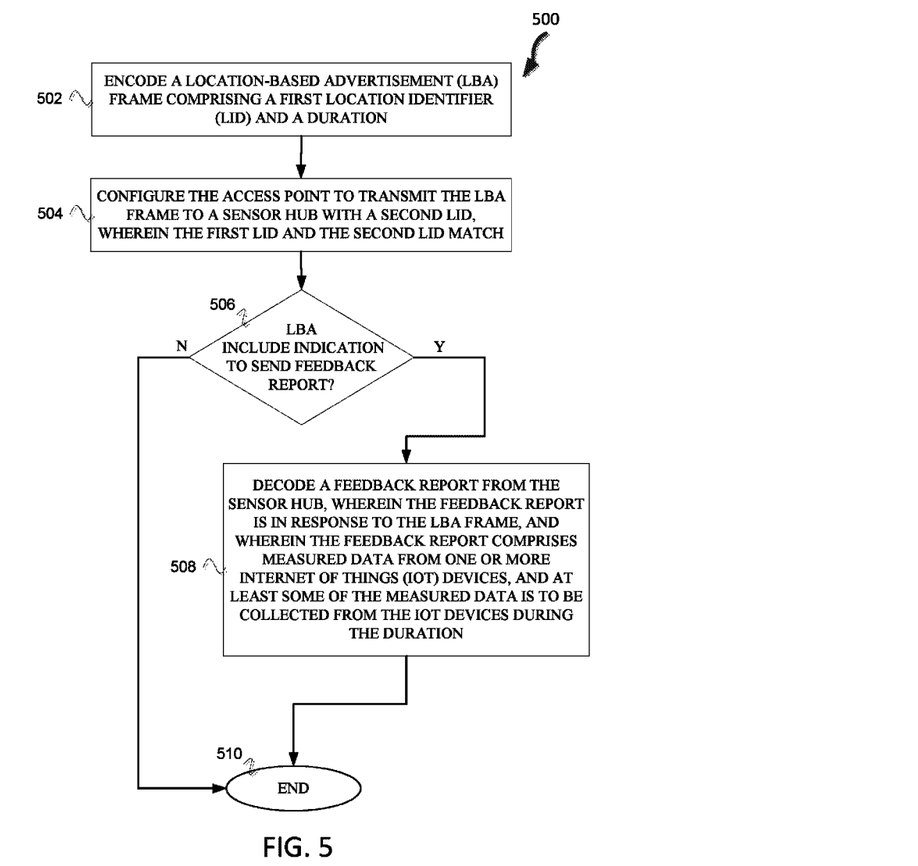
FIG. 5 illustrates a method of location based advertising and querying for low power devices in accordance with some embodiments.

FIG. 5 illustrates a method 300 of location based advertising and querying for low power devices in accordance with some embodiments. The method 500 may begin with encoding a LBA frame comprising a first location identifier (LID) and a duration. For example, the LBA frame 312 (FIG. 3) may be encoded. The duration may be determined based on an estimated time to collect and report the measured data. The duration may cause other wireless devices to not transmit, thus enabling the IoT devices 108, which may be low powered, to transmit and have their transmission reach the station (e.g., access gateway). The LBA frame may include a system configuration 416 as disclosed in conjunction with FIG. 4.

The method 500 may continue at operation 504 with configuring the access point to transmit the LBA frame to a sensor hub with a second LID, wherein the first LID and the second LID match. For example, the LBA frame may include LID 404 (FIG. 4) as disclosed in conjunction with FIG. 4.

The method 500 may continue at operation 506 with determining whether the LBA includes an indication to send a feedback report. If the LBA does not include an indication to send a feedback report, then the method 500 may continue at operation 510 with the method 500 ending. If the LBA does include an indication to send a feedback report, then the method 500 may continue at operation 508 with decoding a feedback report from the sensor hub. The feedback report may be in response to the LBA frame, and the feedback report may include measured data from one or more IoT devices. At least some of the measured data may be collected from the IoT devices during the duration. For example, the access gateway 112 may receive the report 322 (FIG. 3). The method 500 may continue to end 510.

Figure 6:
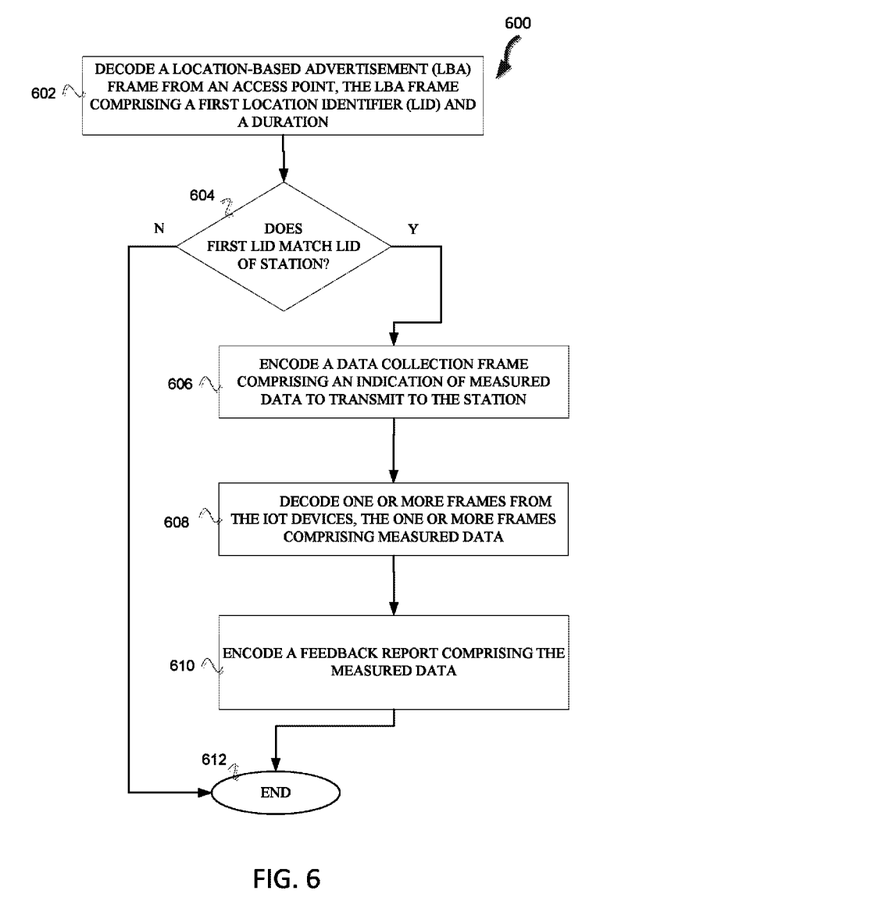
FIG. 6 illustrates a method of location based advertising and querying for low power devices in accordance with some embodiments.

FIG. 6 illustrates a method 600 of location based advertising and querying for low power devices in accordance with some embodiments.

The method 600 begins at operation 602 with decoding a LBA frame from an access point, where the LBA frame comprises a first LID and a duration. For example, a master station 102 may have transmitted a LBA frame 312 or 402 as disclosed in conjunction with FIGS. 3 and 4.

The method 600 may continue at operation 604 with does the first LID match a second LID of the station. For example, access gateway 112 may determine whether or not an LID 307 of LBA frame 312 matches an LID of the access gateway 112. In determining whether the first LID matches the LID of the station, the station may be configured to determine whether a difference between the two LID is less than a threshold, in which case the two LIDs may be said to match. The threshold may be based on a geographic distance which, in some embodiments, may be 0.1 meters to 3 meters. In other embodiments, the threshold may be a different value.

If the first LID does not match the LID of the station, then the method 600 may end 612. If the first LID does match the LID of the station, then the method 600 continues at operation 606 with encoding a data collection frame comprising an indication of measured data to transmit to the station. For example, the sensor hub 110 may transmit the data collection frame 314 as disclosed in conjunction with FIG. 3. The data collection frame may include an order for IoT devices to transmit, a system configuration 416, and may indicate which IoT devices are to report the data. The data collection frame may include a group identifier to indicate a type of data or a group of IoT devices to collect and/or transmit data to the station.

The method 600 continues at operation 608 with decoding one or more frames from the IoT devices, the one or more frames comprising measured data. For example, sensor hub 110 decodes measure data 1 316, measured data 2 318, and measured data 3 320 from IoT devices 108.6, 108.7, and 108.8, respectively. The IoT devices 108 may just report data previously collected or may collect data after receipt of the data collection frame.

The method 600 continues at operation 610 with encoding a feedback report comprising the measured data. For example, sensor hub 110.2 transmits report 322 to the access gateway 112 as disclosed in conjunction with FIG. 3. The method 600 may optionally include configuring the station to transmit the feedback report to the station (not illustrated). The method 600 may end at operation 612.

Figure 7:
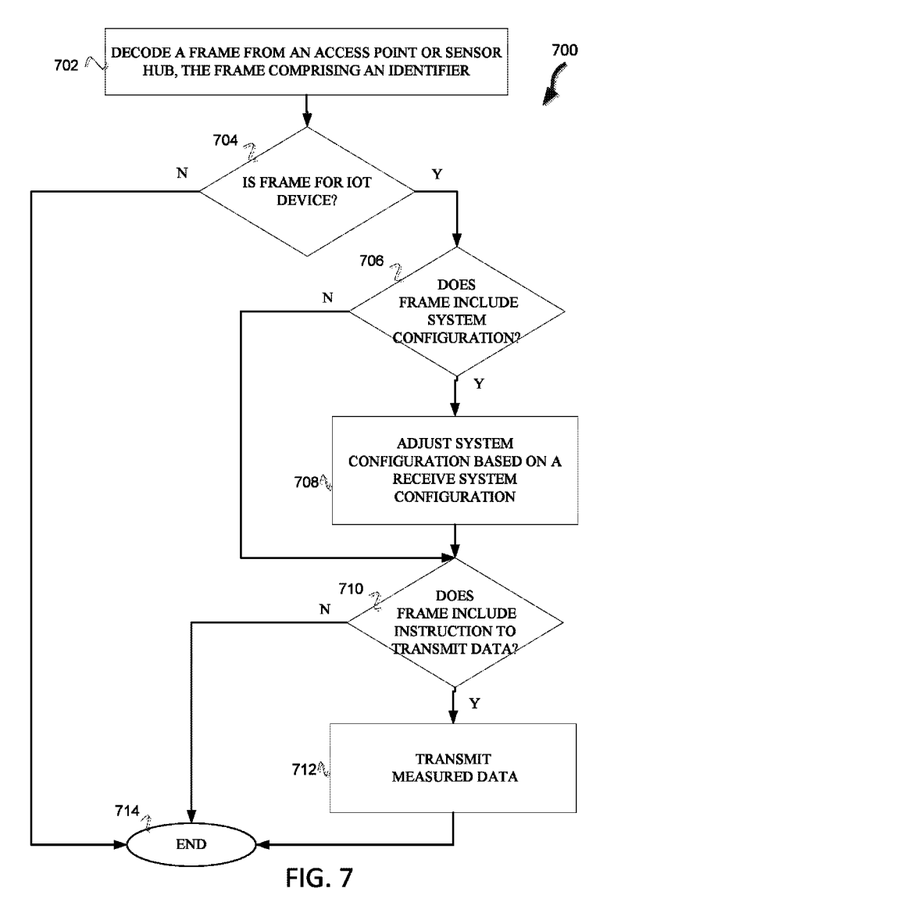
FIG. 7 illustrates a method of location based advertising and querying for low power devices in accordance with some embodiments.

FIG. 7 illustrates a method 700 of location based advertising and querying for low power devices in accordance with some embodiments. The method 700 may begin with the IoT device decoding a frame from an access point or sensor hub, where the frame comprising a first identifier. For example, the first identifier may be a LID.

The method 700 continues at operation 704 with determining whether or not the frame is for the IoT device. For example, the IoT device may include an LID (e.g., 404) and if the received LID is within a threshold of the LID of the IoT device, then the IoT device may determine the frame is for the IoT device. In some embodiments, the identifier may be an AID or another type of identifier that the IoT device compares with an identifier associated with the IoT device.

If the frame is not for the IoT device, then the method 700 ends at operation 714. The method 700 may continue at operation 706 with does the frame include system configurations. If the frame does include a system configuration, then the method 700 continues at operation 708 with adjusting system configuration based on a received system configuration. For example, the LBA frame may include a system configuration 416 and the IoT device may adjust a system configuration of the IoT device based on the system configuration 416. The IoT device may for example change a sleep schedule, change a method of collecting measured data (e.g., a delta time or aggregated data vs. save all data), or change a group identifier for the IoT device.

If the frame does not include a system configuration, then the method 700 continues at operation 710 with does the frame include instructions to transmit data. If the frame does not include instructions to transmit data then the method 700 may end at operation 714.

If the frame does include instruction to transmit data then the method 700 continues at operation 712 with transmitting measured data. For example, IoT devices 108 transmit measure data 316, 318, and 320 as disclosed in conjunction with FIG. 3. The frame may include an indication of an order or time when the IoT device should transmit the data. The method 700 may end at operation 714.

Figure 8:
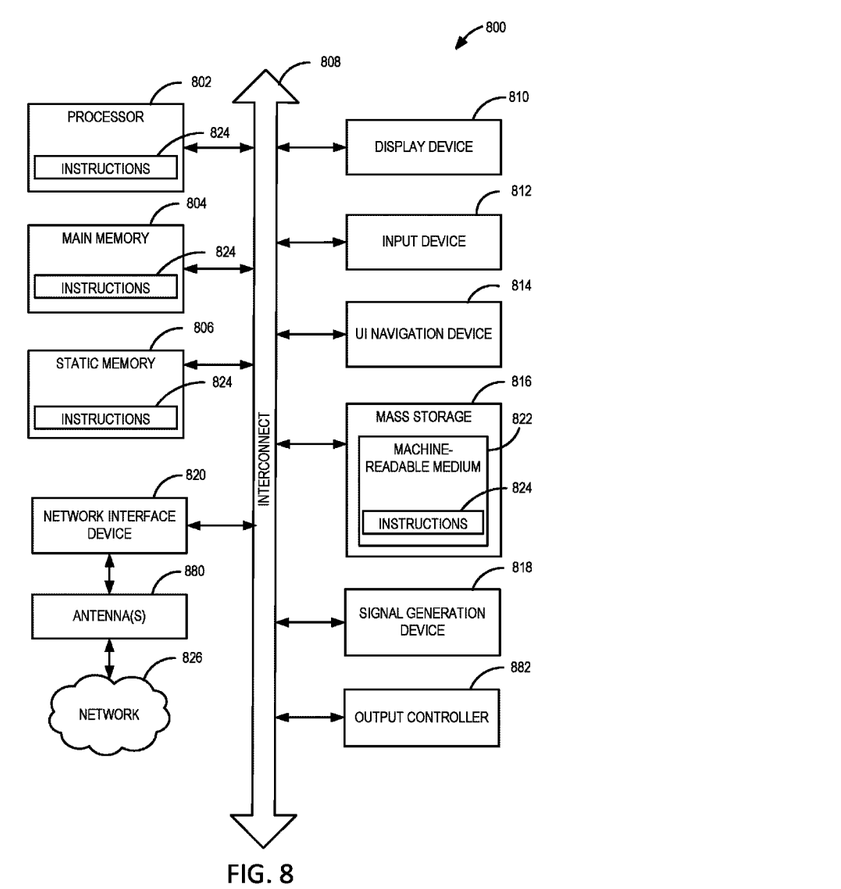
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 102, HE station 104, IoT device 108, a legacy device 106, station 201, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 802 and/or instructions 824 may comprise processing circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

The following examples pertain to further embodiments. Specifics in the examples may be used in one or more embodiments.

Example 1 is an apparatus of an access point comprising memory and processing circuitry coupled to the memory. The processing circuitry configured to: encode a location-based advertisement (LBA) frame comprising a first location identifier (LID) and a duration, configure the access point to transmit the LBA frame to a sensor hub with a second LID, where the first LID and the second LID match, and decode a feedback report from the sensor hub, wherein the feedback report is in response to the LBA frame, and wherein the feedback report comprises measured data from one or more internet of things (IoT) devices, and at least some of the measured data is to be collected by the sensor hub from the IoT devices during the duration.

In Example 2, the subject matter of Example 1 can optionally include where in response to receiving the LBA frame, the sensor hub transmits a data collection frame to the one or more IoT devices to initiate a data collection phase, and transmits the feedback report at the end of the data collection phase.

In Example 3, the subject matter of Examples 1 or 2 can optionally include where the LBA frame to the sensor hub causes the sensor hub to transmit a data collection frame to the one or more IoT devices, and where at least a portion of the measured data from the one or more IoT devices is collected by the sensor hub from the IoT devices in response to the data collection frame.

In Example 4, the subject matter of any of Examples 1-3 can optionally include where the IoT devices transmit measured data to the sensor hub based on a first distance from the sensor hub to the IoT devices being less than a second distance from a second sensor hub to the IoT devices.

In Example 5, the subject matter of any of Examples 1-4 can optionally include where the first LID and the second LID comprise a latitude and a longitude, and where the processing circuitry is further configured to: determine the first LID based on one of a global positioning satellite signals and signals from terrestrial wireless network devices.

In Example 6, the subject matter of any of Examples 1-5 can optionally include where the processing circuitry is further configured to: encode the LBA frame comprising the first LID, the duration, and a system configuration, where the system configuration comprises configuration information for one or both of the sensor hub and the IoT devices.

In Example 7, the subject matter of Example 6 can optionally include where the system configuration comprises at least one from the following group: a sleep cycle for the IoT devices, a sleep cycle for IoT devices with a group identifier, an indication of data to measure for the IoT devices, and an indication of data to measure for the sensor hub.

In Example 8, the subject matter of any of Examples 1-7 can optionally include where the processing circuitry is further configured to: encode a second LBA frame comprising a second LID and a system configuration, and configure the access point to transmit the second LBA frame as an information element of a management frame or a beacon frame.

In Example 9, the subject matter of any of Examples 1-8 can optionally include where the LBA frame further comprises one or more identifiers that indicate one or more types of measured data to be included in the feedback report.

In Example 10, the subject matter of any of Examples 1-9 can optionally include where the processing circuitry is further configured to: associate with one or more other sensor hubs, where the one or more sensor hubs comprises the sensor hub, maintain a location of each of the one or more other sensor hubs, and determine which of the one or more sensor hubs to transmit the LBA to based on a location and the maintained location of each of the one or more sensor hubs.

In Example 11, the subject matter of Example 10 can optionally include where the processing circuitry is further configured to receive the location from a network management entity, and send the feedback report to the management entity.

In Example 12, the subject matter of any of Examples 1-11 can optionally include where the access point is at least one from the following group: a high-efficiency wireless local-area network (HEW) station, a HEW access point, a master station, an Institute of Electrical and Electronic Engineers (IEEE) 802.11ax access point, an access gateway, an IoT gateway, a sensor hub, and an IEEE 802.11ax station.

In Example 13, the subject matter of any of Examples 1-12 can optionally include where the first LID and the second LID match if a second geographic location indicated by the second LID is less than a threshold from a first geographic location indicated by the first LID.

In Example 14, the subject matter of any of Examples 1-13 can optionally include where the LBA frame is to be transmitted in accordance with one or both of orthogonal frequency division multiple access (OFDMA) or multi-user multi-input multiple-output (MU-MIM0), and in accordance with Institute of Electrical and Electronic Engineers (IEEE) 802.11ax.

In Example 15, the subject matter of any of Examples 1-14 can optionally include transceiver circuitry coupled to the memory, and one or more antennas coupled to the transceiver circuitry.

Example 16 is a non-transitory computer-readable storage medium that stores instructions for execution by one or more processors. The instructions to configure the one or more processors to cause an access point to: encode a location-based advertisement (LBA) frame comprising a first location identifier (LID) and a duration, configure the access point to transmit the LBA frame to a sensor hub with a second LID, wherein the first LID and the second LID match, and decode a feedback report from the sensor hub, wherein the feedback report is in response to the LBA frame, and where the feedback report comprises measured data from one or more internet of things (IoT) devices, and at least some of the measured data is to be collected from the IoT devices during the duration.

In Example 17, the subject matter of Example 16 can optionally include where the LBA frame further comprises a receiver address of the sensor hub.

In Example 18, the subject matter of Examples 16 or 17 can optionally include where the instructions further configure the one or more processors to cause the access point to encode the LBA frame comprising the first LID, the duration, and a system configuration, where the system configuration comprises configuration information for one or both of the sensor hub and the IoT devices.

Example 19 is an apparatus of a station comprising memory and processing circuitry coupled to the memory. The processing circuitry configured to: decode a location-based advertisement (LBA) frame from an access point, the LBA frame comprising a first location identifier (LID) and a duration, in response to the first LID matching a second LID of the station, encode a data collection frame comprising an indication of measured data to transmit to the station, configure the station to transmit the data collection frame to one or more IoT devices, decode one or more frames from the IoT devices, the one or more frames comprising measured data, encode a feedback report comprising the measured data, configure the station to transmit the feedback report to the station.

In Example 20, the subject matter of Example 19 can optionally include where the processing circuitry is further configured to: transmit the data collection frame, receive the one or more frame from the IoT devices and transmit the feedback all within the duration.

In Example 21, the subject matter of Examples 19 or 20 can optionally include where the LBA frame further comprises a system configuration, and wherein the processing circuitry is further configured to: configure the station in accordance with the system configuration, and in response to the system configuration indicating a configuration for the IoT devices, encode a configuration frame for the IoT devices in accordance with the system configuration, and configure that station to transmit the configuration frame to the IoT devices, where the system configuration comprises at least one from the following group: a sleep cycle for the IoT devices, a sleep cycle for IoT devices with a group identifier, an indication of data to measure for the IoT devices, and an indication of data to measure for the sensor hub.

In Example 22, the subject matter of any of Examples 19-21 can optionally include where the station is at least one from the following group: a sensor hub, a high-efficiency wireless local-area network (HEW) station, a HEW access point, a master station, an Institute of Electrical and Electronic Engineers (IEEE) 802.11ax access point, a IEEE 802.11ax sensor hub, an access gateway, a sensor hub, and an IEEE 802.11ax station.

In Example 23, the subject matter of any of Examples 20-22 can optionally include transceiver circuitry coupled to the memory; and, one or more antennas coupled to the transceiver circuitry.

Example 24 is a method performed by an access point. The method comprising encoding a location-based advertisement (LBA) frame comprising a first location identifier (LID) and a duration, configuring the access point to transmit the LBA frame to a sensor hub with a second LID, wherein the first LID and the second LID match, and decoding a feedback report from the sensor hub, wherein the feedback report is in response to the LBA frame, and where the feedback report comprises measured data from one or more internet of things (IoT) devices, and at least some of the measured data is to be collected from the IoT devices during the duration.

In Example 25, the subject matter of Example 24 can optionally include encoding the LBA frame comprising the first LID, the duration, and a system configuration, where the system configuration comprises configuration information for one or both of the sensor hub and the IoT devices.

Example 26 is an apparatus of an access point. The apparatus comprising: means for encoding a location-based advertisement (LBA) frame comprising a first location identifier (LID) and a duration, means for configuring the access point to transmit the LBA frame to a sensor hub with a second LID, where the first LID and the second LID match, and means for decoding a feedback report from the sensor hub, wherein the feedback report is in response to the frame, and wherein the feedback report comprises measured data from one or more internet of things (IoT) devices, and at least some of the measured data is to be collected by the sensor hub from the IoT devices during the duration.

In Example 27, the subject matter of Example 26 can optionally include where in response to receiving the LBA frame, the sensor hub transmits a data collection frame to the one or more IoT devices to initiate a data collection phase, and transmits the feedback report at the end of the data collection phase.

In Example 28, the subject matter of Examples 26 or 27 can optionally include where the LBA frame to the sensor hub causes the sensor hub to transmit a data collection frame to the one or more IoT devices, and where at least a portion of the measured data from the one or more IoT devices is collected by the sensor hub from the IoT devices in response to the data collection frame.

In Example 29, the subject matter of any of Examples 26-28 can optionally include where the IoT devices transmit measured data to the sensor hub based on a first distance from the sensor hub to the IoT devices being less than a second distance from a second sensor hub to the IoT devices.

In Example 30, the subject matter of any of Examples 26-29 can optionally include where the first LID and the second LID comprise a latitude and a longitude, and further comprising: determine the first LID based on one of a global positioning satellite signals and signals from terrestrial wireless network devices.

In Example 31, the subject matter of any of Examples 26-30 can optionally include encode the LBA frame comprising the first LID, the duration, and a system configuration, where the system configuration comprises configuration information for one or both of the sensor hub and the IoT devices.

In Example 32, the subject matter of Example 31 can optionally include where the system configuration comprises at least one from the following group: a sleep cycle for the IoT devices, a sleep cycle for IoT devices with a group identifier, an indication of data to measure for the IoT devices, and an indication of data to measure for the sensor hub.

In Example 33, the subject matter of any of Examples 26-32 can optionally include encode a second LBA frame comprising a second LID and a system configuration, and configure the access point to transmit the second LBA frame as an information element of a management frame or a beacon frame.

In Example 34, the subject matter of any of Examples 26-33 can optionally include where the LBA frame further comprises one or more identifiers that indicate one or more types of measured data to be included in the feedback report.

In Example 35, the subject matter of any of Examples 26-34 can optionally include associate with one or more other sensor hubs, wherein the one or more sensor hubs comprises the sensor hub, maintain a location of each of the one or more other sensor hubs, and determine which of the one or more sensor hubs to transmit the LBA based on a location and the maintained location of each of the one or more sensor hubs.

In Example 36, the subject matter of Example 35 can optionally include receive the location from a network management entity, and send the feedback report to the management entity.

In Example 37, the subject matter of any of Examples 26-36 can optionally include where the access point is at least one from the following group: a high-efficiency wireless local-area network (HEW) station, a HEW access point, a master station, an Institute of Electrical and Electronic Engineers (IEEE) 802.11ax access point, an access gateway, an IoT gateway, a sensor hub, and an IEEE 802.11ax station.

In Example 38, the subject matter of any of Examples 26-37 can optionally include where the first LID and the second LID match if a second geographic location indicated by the second LID is less than a threshold from a first geographic location indicated by the first LID.

In Example 39, the subject matter of any of Examples 26-38 can optionally include where the LBA frame is to be transmitted in accordance with one or both of orthogonal frequency division multiple access (OFDMA) or multi-user multi-input multiple-output (MU-MIMO), and in accordance with Institute of Electrical and Electronic Engineers (IEEE) 802.11ax.

In Example 40, the subject matter of any of Examples 26-39 can optionally include means for transmitting and receiving radio signals.

Example 41 is a non-transitory computer-readable storage medium that stores instructions for execution by one or more processors. The instructions to configure the one or more processors to cause a station to: decode a location-based advertisement (LBA) frame from an access point, the LBA frame comprising a first location identifier (LID) and a duration, in response to the first LID matching a second LID of the station, encode a data collection frame comprising an indication of measured data to transmit to the station, configure the station to transmit the data collection frame to one or more IoT devices, decode one or more frames from the IoT devices, the one or more frames comprising measured data. The instructions to further configure the one or more processors to cause a station to: encode a feedback report comprising the measured data, and configure the station to transmit the feedback report to the station.

In Example 42, the subject matter of Example 41 can optionally include where the instructions further configure the one or more processors to cause the access point to: transmit the data collection frame, receive the one or more frame from the IoT devices and transmit the feedback all within the duration.

In Example 43, the subject matter of Examples 41 or 42 can optionally include where the LBA frame further comprises a system configuration, and wherein the instructions further configure the one or more processors to cause the access point to: configure the station in accordance with the system configuration, and in response to the system configuration indicating a configuration for the IoT devices, encode a configuration frame for the IoT devices in accordance with the system configuration, and configure that station to transmit the configuration frame to the IoT devices, where the system configuration comprises at least one from the following group: a sleep cycle for the IoT devices, a sleep cycle for IoT devices with a group identifier, an indication of data to measure for the IoT devices, and an indication of data to measure for the sensor hub.

In Example 44, the subject matter of any of Examples 41-43 can optionally include where the station is at least one from the following group: a sensor hub, a high-efficiency wireless local-area network (HEW) station, a HEW access point, a master station, an Institute of Electrical and Electronic Engineers (IEEE) 802.11ax access point, a IEEE 802.11ax sensor hub, an access gateway, a sensor hub, and an IEEE 802.11ax station.

Example 45 is a method performed by a station. The method comprising: decoding a location-based advertisement (LBA) frame from an access point, the LBA frame comprising a first location identifier (LID) and a duration, in response to the first LID matching a second LID of the station, encoding a data collection frame comprising an indication of measured data to transmit to the station, configuring the station to transmit the data collection frame to one or more IoT devices, decoding one or more frames from the IoT devices, the one or more frames comprising measured data. The method may further comprise encoding a feedback report comprising the measured data, and configuring the station to transmit the feedback report to the station.

In Example 46, the subject matter of Example 45 can optionally include transmitting the data collection frame, receive the one or more frame from the IoT devices and transmit the feedback all within the duration.

In Example 47, the subject matter of Examples 45 or 46 can optionally include where the LBA frame further comprises a system configuration, and further comprising: configuring the station in accordance with the system configuration, and in response to the system configuration indicating a configuration for the IoT devices, encoding a configuration frame for the IoT devices in accordance with the system configuration, and configure that station to transmit the configuration frame to the IoT devices, wherein the system configuration comprises at least one from the following group: a sleep cycle for the IoT devices, a sleep cycle for IoT devices with a group identifier, an indication of data to measure for the IoT devices, and an indication of data to measure for the sensor hub.

In Example 48, the subject matter of any of Examples 45-47 can optionally include where the station is at least one from the following group: a sensor hub, a high-efficiency wireless local-area network (HEW) station, a HEW access point, a master station, an Institute of Electrical and Electronic Engineers (IEEE) 802.11ax access point, a IEEE 802.11ax sensor hub, an access gateway, a sensor hub, and an IEEE 802.11ax station.

Example 49 is an apparatus of a station. The apparatus comprising: means for decoding a location-based advertisement (LBA) frame from an access point, the LBA frame comprising a first location identifier (LID) and a duration; in response to the first LID matching a second LID of the station, means for encoding a data collection frame comprising an indication of measured data to transmit to the station, means for configuring the station to transmit the data collection frame to one or more IoT devices, means for decoding one or more frames from the IoT devices, the one or more frames comprising measured data. The apparatus further comprising means for encoding a feedback report comprising the measured data, and means for configuring the station to transmit the feedback report to the station.

In Example 50, the subject matter of Example 49 can optionally include means for transmitting the data collection frame, receive the one or more frame from the IoT devices and transmit the feedback all within the duration.

In Example 51, the subject matter of Examples 49 or 50 can optionally include where the LBA frame further comprises a system configuration, and further comprising: means for configuring the station in accordance with the system configuration, and in response to the system configuration indicating a configuration for the IoT devices, means for encoding a configuration frame for the IoT devices in accordance with the system configuration, and configure that station to transmit the configuration frame to the IoT devices, where the system configuration comprises at least one from the following group: a sleep cycle for the IoT devices, a sleep cycle for IoT devices with a group identifier, an indication of data to measure for the IoT devices, and an indication of data to measure for the sensor hub.

In Example 52, the subject matter of any of Examples 49-51 can optionally include where the station is at least one from the following group: a sensor hub, a high-efficiency wireless local-area network (HEW) station, a HEW access point, a master station, an Institute of Electrical and Electronic Engineers (IEEE) 802.11ax access point, a IEEE 802.11ax sensor hub, an access gateway, a sensor hub, and an IEEE 802.11ax station.

Example 53 is an apparatus of a sensor hub including: memory and processing circuitry coupled to the memory, the processing circuitry configured to: associate with a master station; decode a location-based advertisement (LBA) frame comprising a first location identifier (LID) and a duration from the master station; encode a data collection frame to one or more Internet of Things (IoT) devices to initiate a data collection phase; receive measured data from at least one of the one or more IoT devices; and encode a feedback report to the master station comprising the measured data.

In Example 54, the subject matter of Example 53 can optionally include where the processing circuitry is further configured to match the first LID with a second LID of the sensor hub, and if the first LID and the second LID do not match, ignore the LBA frame.

In Example 55, the subject matter of Example 53 can optionally include transceiver circuitry coupled to the memory; and, one or more antennas coupled to the transceiver circuitry.

Example 56 is a non-transitory computer-readable storage medium that stores instructions for execution by one or more processors, the instructions to configure the one or more processors to cause a sensor hub to: associate with a master station; decode a location-based advertisement (LBA) frame comprising a first location identifier (LID) and a duration from the master station; encode a data collection frame to one or more Internet of Things (IoT) devices to initiate a data collection phase; receive measured data from at least one of the one or more to IoT devices; and encode a feedback report to the master station comprising the measured data.

In Example 57, the subject matter of Example 56 can optionally include where the instructions further configure the one or more processors to cause the sensor hub to: match the first LID with a second LID of the sensor hub, and if the first LID and the second LID do not match, ignore the LBA frame.

In Example 58, the subject matter of Example 56 can optionally include transceiver circuitry coupled to the memory; and, one or more antennas coupled to the transceiver circuitry.

Example 59 is a method performed by a sensor hub, the method comprising: associating with a master station; decoding a location-based advertisement (LBA) frame comprising a first location identifier (LID) and a duration from the master station; encoding a data collection frame to one or more Internet of Things (IoT) devices to initiate a data collection phase; receiving measured data from at least one of the one or more IoT devices; and encoding a feedback report to the master station comprising the measured data.

In Example 60, the subject matter of Example 59 can optionally include matching the first LID with a second LID of the sensor hub, and if the first LID and the second LID do not match, ignore the LBA frame.

Example 61 is a sensor hub, the sensor hub including: means for storing and retrieving data; means for associating with a master station; means for decoding a location-based advertisement (LBA) frame comprising a first location identifier (LID) and a duration from the master station; means for encoding a data collection frame to one or more Internet of Things (IoT) devices to initiate a data collection phase; means for receiving measured data from at least one of the one or more IoT devices; and means for encoding a feedback report to the master station comprising the measured data.

In Example 62, the subject matter of Example 61 can optionally include means for matching the first LID with a second LID of the sensor hub, and if the first LID and the second LID do not match, ignore the LBA frame.

In Example 63, the subject matter of Example 61 can optionally include means for processing received electromagnetic waves coupled to the means for storing and receiving data; and means for transmitting and receiving electromagnetic waves coupled to the means processing received electromagnetic waves.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point comprising: memory and processing circuitry coupled to the memory, the processing circuitry configured to:
    encode a location-based advertisement (LBA) frame comprising a first location identifier (LID) and a duration;
    configure the access point to transmit the LBA frame to a sensor hub with a second LID, wherein the first LID and the second LID match; and
    decode a feedback report from the sensor hub, wherein the feedback report is in response to the LBA frame, and wherein the feedback report comprises measured data from one or more internet of things (IoT) devices, and at least some of the measured data is to be collected by the sensor hub from the IoT devices during the duration.

2. The apparatus of claim 1, wherein in response to receiving the LBA frame, the sensor hub transmits a data collection frame to the one or more IoT devices to initiate a data collection phase, and transmits the feedback report at the end of the data collection phase.

3. The apparatus of claim 1, wherein the LBA frame to the sensor hub causes the sensor hub to transmit a data collection frame to the one or more IoT devices, and wherein at least a portion of the measured data from the one or more IoT devices is collected by the sensor hub from the IoT devices in response to the data collection frame.

4. The apparatus of claim 1, wherein the IoT devices transmit measured data to the sensor hub based on a first distance from the sensor hub to the IoT devices being less than a second distance from a second sensor hub to the IoT devices.

5. The apparatus of claim 1, wherein the first LID and the second LID comprise a latitude and a longitude, and wherein the processing circuitry is further configured to:
    determine the first LID based on one of a global positioning satellite signals and signals from terrestrial wireless network devices.

6. The apparatus of claim 1, wherein the processing circuitry is further configured to:
    encode the LBA frame comprising the first LID, the duration, and a system configuration, wherein the system configuration comprises configuration information for one or both of the sensor hub and the IoT devices.

7. The apparatus of claim 6, wherein the system configuration comprises at least one from the following group: a sleep cycle for the IoT devices, a sleep cycle for IoT devices with a group identifier, an indication of data to measure for the IoT devices, and an indication of data to measure for the sensor hub.

8. The apparatus of claim 1, wherein the processing circuitry is further configured to:
encode a second LBA frame comprising a second LID and a system configuration; and
configure the access point to transmit the second LBA frame as an information element of a management frame or a beacon frame.

9. The apparatus of claim 1, wherein the LBA frame further comprises one or more identifiers that indicate one or more types of measured data to be included in the feedback report.

10. The apparatus of claim 1, wherein the processing circuitry is further configured to:
associate with one or more other sensor hubs, wherein the one or more sensor hubs comprises the sensor hub;
maintain a location of each of the one or more other sensor hubs; and
determine which of the one or more sensor hubs to transmit the LBA to based on a location and the maintained location of each of the one or more sensor hubs.

11. The apparatus of claim 10, wherein the processing circuitry is further configured to:
receive the location from a network management entity; and
send the feedback report to the management entity.

12. The apparatus of claim 1, wherein the access point is at least one from the following group: a high-efficiency wireless local-area network (HEW) station, a HEW access point, a master station, an Institute of Electrical and Electronic Engineers (IEEE) 802.11ax access point, an access gateway, an IoT gateway, a sensor hub, and an IEEE 802.11ax station.

13. The apparatus of claim 1, wherein the first LID and the second LID match if a second geographic location indicated by the second LID is less than a threshold from a first geographic location indicated by the first LID.

14. The apparatus of claim 1, wherein the LBA frame is to be transmitted in accordance with one or both of orthogonal frequency division multiple access (OFDMA) or multi-user multi-input multiple-output (MU-MIMO), and in accordance with Institute of Electrical and Electronic Engineers (IEEE) 802.11ax.

15. The apparatus of claim 1, further comprising: transceiver circuitry coupled to the memory; and, one or more antennas coupled to the transceiver circuitry.

16. A non-transitory computer-readable storage medium that stores instructions for execution by one or more processors, the instructions to configure the one or more processors to cause an access point to:
encode a location-based advertisement (LBA) frame comprising a first location identifier (LID) and a duration;
configure the access point to transmit the LBA frame to a sensor hub with a second LID, wherein the first LID and the second LID match; and
decode a feedback report from the sensor hub, wherein the feedback report is in response to the LBA frame, and wherein the feedback report comprises measured data from one or more internet of things (IoT) devices, and at least some of the measured data is to be collected from the IoT devices during the duration.

17. The non-transitory computer-readable storage medium of claim 16, wherein the LBA frame further comprises a receiver address of the sensor hub.

18. The non-transitory computer-readable storage medium of claim 16, wherein the instructions further configure the one or more processors to cause the access point to:
encode the LBA frame comprising the first LID, the duration, and a system configuration, wherein the system configuration comprises configuration information for one or both of the sensor hub and the IoT devices.

19. An apparatus of a station comprising: memory and processing circuitry coupled to the memory, the processing circuitry configured to:
decode a location-based advertisement (LBA) frame from an access point, the LBA frame comprising a first location identifier (LID) and a duration;
in response to the first LID matching a second LID of the station,
encode a data collection frame comprising an indication of measured data to transmit to the station,
configure the station to transmit the data collection frame to one or more IoT devices,
decode one or more frames from the IoT devices, the one or more frames comprising measured data;
encode a feedback report comprising the measured data; and
configure the station to transmit the feedback report to the station.

20. The apparatus of claim 19, wherein the processing circuitry is further configured to:
transmit the data collection frame, receive the one or more frame from the IoT devices and transmit the feedback all within the duration.

21. The apparatus of claim 19, wherein the LBA frame further comprises a system configuration, and wherein the processing circuitry is further configured to:
configure the station in accordance with the system configuration; and
in response to the system configuration indicating a configuration for the IoT devices, encode a configuration frame for the IoT devices in accordance with the system configuration, and configure that station to transmit the configuration frame to the IoT devices, wherein the system configuration comprises at least one from the following group: a sleep cycle for the IoT devices, a sleep cycle for IoT devices with a group identifier, an indication of data to measure for the IoT devices, and an indication of data to measure for the sensor hub.

22. The apparatus of claim 19, wherein the station is at least one from the following group: a sensor hub, a high-efficiency wireless local-area network (HEW) station, a HEW access point, a master station, an Institute of Electrical and Electronic Engineers (IEEE) 802.11ax access point, a IEEE 802.11ax sensor hub, an access gateway, a sensor hub, and an IEEE 802.11ax station.

23. The apparatus of claim 20, further comprising: transceiver circuitry coupled to the memory; and, one or more antennas coupled to the transceiver circuitry.

24. A method performed by an access point, the method comprising:
encoding a location-based advertisement (LBA) frame comprising a first location identifier (LID) and a duration;
configuring the access point to transmit the LBA frame to a sensor hub with a second LID, wherein the first LID and the second LID match; and
decoding a feedback report from the sensor hub, wherein the feedback report is in response to the LBA frame, and wherein the feedback report comprises measured data from one or more internet of things (IoT) devices, and at least some of the measured data is to be collected from the IoT devices during the duration.

25. The method of claim 24, further comprising: encoding the LBA frame comprising the first LID, the duration, and a system configuration, wherein the system configuration comprises configuration information for one or both of the sensor hub and the IoT devices.

26. An apparatus of a sensor hub comprising: memory and processing circuitry coupled to the memory, the processing circuitry configured to:
associate with a master station;
decode a location-based advertisement (LBA) frame comprising a first location identifier (LID) and a duration from the master station;
encode a data collection frame to one or more Internet of Things (IoT) devices to initiate a data collection phase;
receive measured data from at least one of the one or more IoT devices; and
encode a feedback report to the master station comprising the measured data.

27. The apparatus of claim 26, wherein the processing circuitry is further configured to:
match the first LID with a second LID of the sensor hub, and if the first LID and the second LID do not match, ignore the LBA frame.

28. The apparatus of claim 25, further comprising: transceiver circuitry coupled to the memory; and, one or more antennas coupled to the transceiver circuitry.

* * * * *